United States Patent [19]
Lacam

[11] 3,770,552
[45] Nov. 6, 1973

[54] DEVICE FOR CUTTING AND FORMING STOP CONNECTIONS FOR A SLIDING FASTENER CONTINUOUSLY SEWN ON A SERIES OF WORKPIECES

[75] Inventor: Guy Lacam, Paris, France

[73] Assignee: La Fermeture Ailee, Airaines, France

[22] Filed: Nov. 8, 1971

[21] Appl. No.: 196,639

[30] Foreign Application Priority Data
Nov. 23, 1970 France .............................. 7041983

[52] U.S. Cl..................... 156/510, 156/66, 156/580
[51] Int. Cl. ...................... B33b 31/00, A41h 37/00
[58] Field of Search........................ 156/66, 73, 580, 156/510

[56] References Cited
UNITED STATES PATENTS

| | | | |
|---|---|---|---|
| 3,488,239 | 1/1970 | Heimberger | 156/66 |
| 3,558,407 | 1/1971 | Ballard et al. | 156/73 |
| 3,103,728 | 9/1963 | Wahl | 156/66 |
| R25,935 | 12/1965 | Porepp | 156/66 |
| 3,457,132 | 7/1969 | Tuma et al. | 156/73 |

Primary Examiner—Douglas J. Drummond
Attorney—Robert S. Swecker

[57] ABSTRACT

Device for simultaneously cutting and forming a stop connection on a sliding fastener composed of plastics material and supplied continuously and sewn to a series of workpieces. The device comprises a base having guide means for the fastener and an anvil fixed to the base. An element is made to undergo an alternating movement perpendicular to the plane of the anvil. The element carries means for cutting the fastener and means for forming, by a welding action, a stop connection in the fastener. The cutting means are offset from the forming means in the direction in which the fastener is guided by the guide means.

7 Claims, 8 Drawing Figures

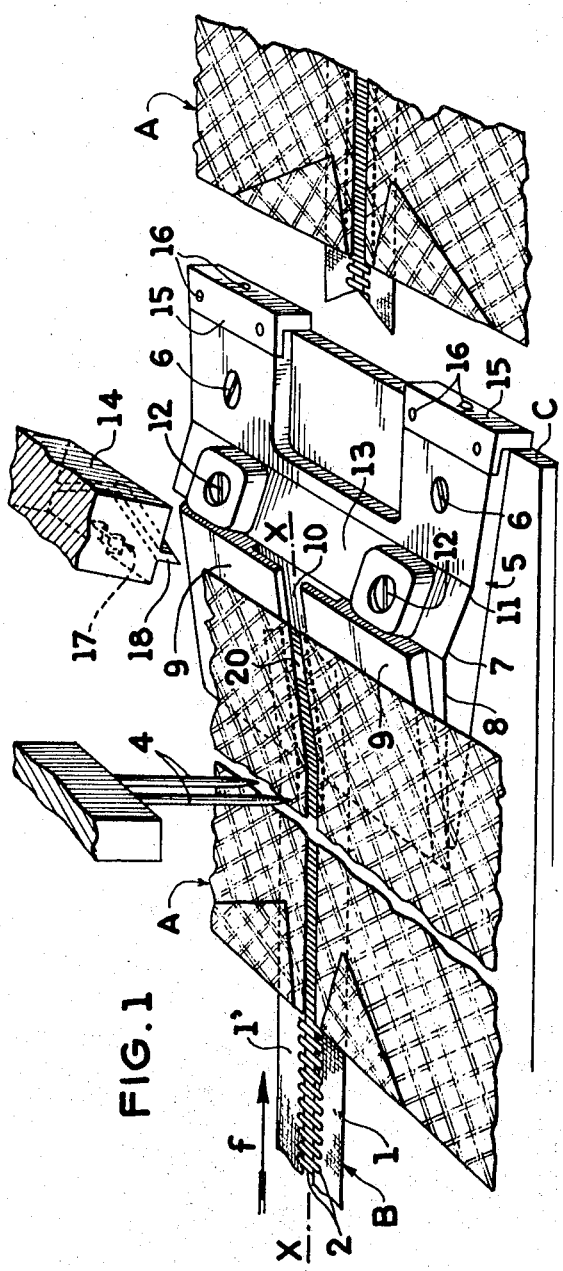
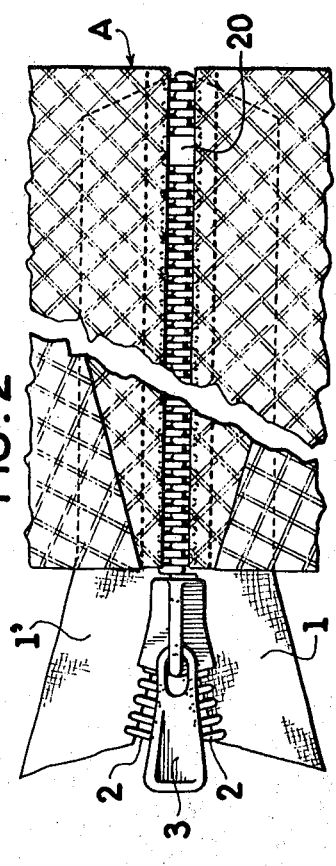

DEVICE FOR CUTTING AND FORMING STOP CONNECTIONS FOR A SLIDING FASTENER CONTINUOUSLY SEWN ON A SERIES OF WORKPIECES

The present invention relates to the cutting and forming of stop connections at spaced points of a sliding fastener which is sewn continuously to a series of workpieces and in particular clothing.

Sliding fasteners are used to an increasing extent in the clothing industry which are in the form of continuous strips usually supplied in rolls. Such continuous strips avoid the necessity of storing slide fasteners in various lengths required for the various workpieces which must be provided with these fasteners. However, these fasteners only afford a considerable saving in time when sewn to the workpieces if the finishing and sewing operations can be carried out in a rational manner.

Mechanical devices are known which cut a section of the sliding fastener to the required length after the fastener has been sewn to the clothing. Other devices are known which form a metal stop clipped at one end of the fastener section, the stop at the other end usually being formed, after assembly of the conventional slide for operating the fastener, by the insertion of this suitably projecting end portion in a hem of the workpiece.

Now, independent devices are space consuming and hinder the operator in his work for attaching the slides.

Thus, ultrasounds have recently been employed for cutting the fasteners and forming the stops by melting the synthetic material of the fastener.

However, the two operations must be separate, since the welding cannot occur simultaneously with the cutting, otherwise the stop would extend into the two successive fastener sections and prevent the mounting of the slide. Each section would indeed have a stop at each end and no projecting free end portion.

An object of the invention is to provide a device for cutting and forming stop connections on a sliding fastener composed of synthetic material in the course of the continuous sewing of the fastener to a series of workpieces, said device being small and thus avoiding the aforementioned drawbacks.

The device according to the invention comprises in combination a base having guide means for the sliding fastener, an anvil fixed to the base and co-operating with an element having cutting means and means for forming by welding a stop connection for the sliding fastener, said element undergoing an alternating movement perpendicular to the plane of the anvil and said two means being offset from each other in the direction of travel of the fastener through the device.

With this arrangement, it is possible, while perfectly guiding the sliding fastener, to produce simultaneously and rapidly at a first point of the fastener a stop connection and, at another point separate from and in the vicinity of the first point, a cut in the fastener so that the stop formed concerns only one of the two fastener sections separated by the cut.

Preferably, said element is metallic and connected to an ultrasound generator the cutting and the forming of the stop being effected under the action of ultrasonic vibrations communicated by the generator to the element.

Further features and advantages of the invention will be apparent from the ensuing description with reference to the accompanying drawings.

In the drawings:

FIG. 1 is a perspective view of a device according to the invention after the cutting and the forming of a stop connection on the section of the sliding fastener which follows the connection point;

FIG. 2 is a plan view of the workpiece and its corresponding section of sliding fastener, the insertion of a slide being shown;

Figure 3:
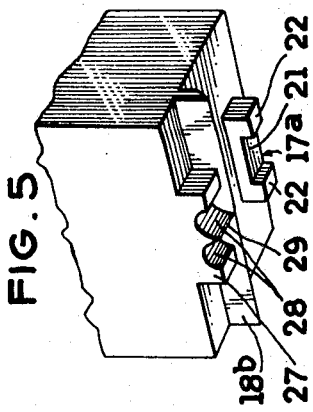
FIGS. 3–5 are bottom perspective views of various/- metal means for cutting and forming a stop connection on a sliding fastener.

In the illustrated embodiments, the invention is used in the sewing of a series of pieces of cloth or fabric A to sections of a sliding fastener which is supplied in the form of a continuous strip B constituted by two bands 1 and 1' having on their adjacent edge portions hooking elements 2 adapted to be hooked together or unhooked from each other by means of a conventional slide 3 shown in FIG. 2. The two stitching lines for fixing the bands 1 and 1' to each workpiece A are produced by two needles 4 of a sewing machine, and sewing being carried out very near to and on each side of the hooking elements 2.

The device according to the invention is arranged in such manner as to be capable of being placed on the table C of the machine on the downstream side of the needles with respect to the direction of travel of workpiece A through the device indicated by arrow $f$ in FIG. 1. The device comprises a base 5 fixed by screws 6 to the table C of the sewing machine.

The base comprises a raised portion 7 having an inverted V-shaped longitudinal section. On the inclined face 8 of the V-sectioned portion 7 in the vicinity of the needles 4 there are attached two L-sectioned guide members 9 located on each side of a longitudinal axis X—X and at a distance from the latter so as to define a longitudinal recess 10 having an inverted T shape in which are longitudinally guided the bands 1 and 1' and the hooking elements 2 of the sliding fastener.

On the other inclined face 11 of the V-sectioned portion 7 there is fixed by screws 12 located on each side of the axis X—X a metal anvil 13 which has two lateral bosses 13a defining a centre portion having a width at least equal to that of the recess 10. The anvil is adapted to co-operate with a metal element or "sonotrode" 14 which undergoes a to-and-fro movement and is connected to an ultrasound generator (not shown), this sonotrode being inclined at the same angle to the horizontal as the anvil 13. The sonotrode 14 can be applied against the anvil 13 and in order to avoid movement of the latter rearwardly under the effect of the shock produced, two L-shaped heels 15 are provided and fixed by screws 16 to the stand 5 and the table C.

Engraved on the sonotrode at a distance from each other in the direction of travel of the fastener, there is a boss 17 constituting a punch and a cutting edge 18. These means 17 and 18 are not attached to the sonotrode but directly engraved thereon so that when the sonotrode undergoes an ultrasonic movement these means vibrate at the same frequency as the body of the sonotrode.

The cutting edge 18, which projects a little more than the boss 17, has a V shape in plan (FIGS. 1 & 3) and includes a beveled portion 19. The beveled portion 19 is provided to facilitate dissipation of heat when the sonotrode is applied against the sliding fastener and thus avoid welding the hooking elements 2 together when the bands 1 and 1' and the hooking elements 2 are cut.

The boss 17 constituting a punch has a generally rectangular-sided shape and, when the sonotrode moves downwardly, the boss 17 crushes the hooking elements 2 and welds them together owing to the heat given out by the sonotrode.

Figure 4:
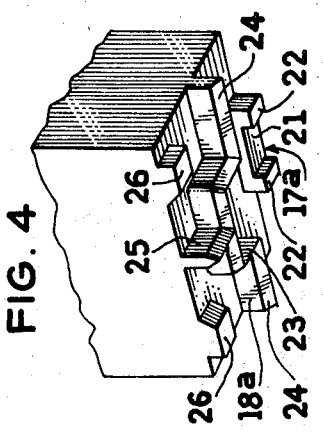
Figure 5:
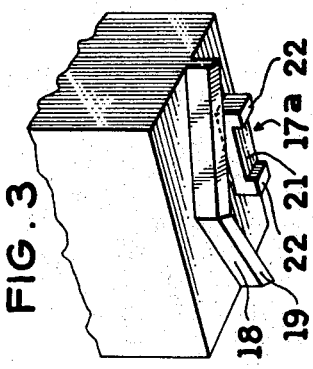

FIGS. 3-5 show the various modifications of the sonotrode and will be explained in detail hereinafter when describing operation of the device.

The sliding fastener of synthetic material with no slide or stops or connections is supplied continuously from a supply reel (not shown) and is engaged in the longitudinal recess 10 until it rests on the anvil 13. The sonotrode is then lowered between the boss 13a of the anvil. The cutting edge 18 is applied against the anvil and cuts the sliding fastener in the shape of a V transversely of the direction shown by arrow *f* and the punch 17 simultaneously crushes and welds the hooking elements 2 and thus forms a stop connection 20 at a distance from the cutting. After having raised the sonotrode, the operator moves rearwardly the sliding fastener provided with the connnection 20 and applies the edges of the workpiece on each side of the hooking elements 2, the lower part of the workpiece being in alignment with the cut part of the sliding fastener (left side of FIG. 1) and its edges being engaged with the fastener in the recess 10 constituting a guide.

The operator then sews the fastener and the workpiece together by feeding them until the part of the workpiece opposed to the connection 20 has passed a few centimetres beyond the anvil 13.

At this moment the operator lowers the sonotrode manually or closes a switch which brings the sonotrode into operation. The cutting edge 18 cuts the sliding fastener transversely into two separate sections while the boss or punch 17 separately welds the adjacent hooking elements 2. Thus two fastener sections are obtained, namely one section (right side of FIG. 1) which is sewn to the workpiece and has a free end portion cut in the shape of a V and an opposite end portion provided with the connection 20 produced in the preceding operation, and a second section (left side of FIG. 1) having only a connection 20 at a distance from the V-shaped cut.

A stop connection is thus simultaneously cut and formed by operations effected at a distance from each other so that the connection is made only on one of the sections and not at the junction between the two sections of the fastener. The work proceeds continuously until the series of workpieces A have been sewn to the continuous sliding fastener which is cut and provided with stop connections. The sections of the fastener with the workpieces are provided with their slides (FIG. 2) as work proceeds, the V shape of the cut facilitating the introduction of the slide 3 in the fastener. This slide separates the hooking elements until it reaches the connection 20.

FIGS. 3-5 show various modifications of the sonotrode, the shape of the elements 17 and 18 being designed to facilitate the mounting of the slide on the sliding fastener.

Figure 6:
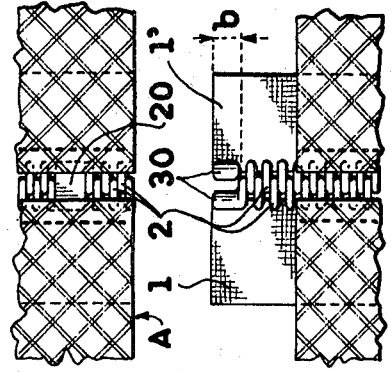
FIGS. 6–8 are plan views of sliding fasteners after the cutting and forming of a stop connection by means of the metal means shown in FIGS. 3, 4 and 5 respectively.
Figure 7:
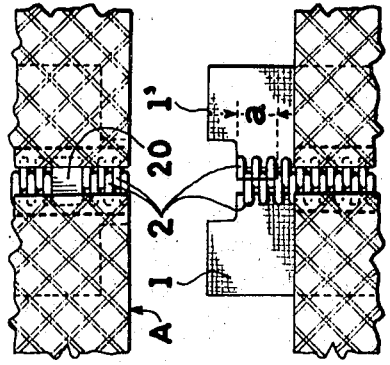
Figure 8:
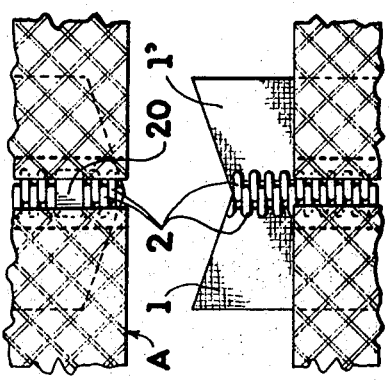

FIGS. 6-8 show the results obtained with the various sonotrodes.

The punches 17a show in FIGS. 3-5 have an inverted U shape forming a passage 21 in which the hooking elements 2 are engaged. The two bosses 22 on each side of the middle part act as guide means and prevent an excessive melting of the hooking elements when the punches are applied thereagainst. The cutting edge shown in FIG. 3 makes a V-shaped cut in the sliding fastener and is similar to that shown in FIG. 1. The result obtained is shown in FIG. 6.

As concerns the modification of the sonotrode shown in FIG. 4, the cutting edge 18a has the general shape of a U. In fact it has the shape of a U of which each limb 23 is extended by an arm 24 which is perpendicular thereto and extends to the edge of the sonotrode. A projection 25 perpendicular to the web of the U is located in the middle thereof and extends to the region of the end of the sonotrode opposed to the punch 17a. This projection 25, which projects to the same extent as the cutting edge, is beveled on both sides and the cutting edge and the arms are beveled only on one side.

Two bosses shorter than the cutting edge 23 and projection 25 are located on each side of the projection 25.

By applying the cutting edge on the sliding fastener the latter is cut both in the shape of this edge and along the projection 25, the latter acting along the longitudinal axis of the fastener and thus separating the adjacent hooking elements 2 for a short distance *a*. The result is shown in FIG. 7.

The modification shown in FIG. 5 comprises a cutting edge 18b having a rectilinear part which is beveled on one side. This cutting edge is extended in its centre part opposed to the punch 17a by a rectangular-sided block 27 in which are formed semi-circular recesses 28 which form therebetween a cutting edge 29 located mid-way of the rectilinear cutting edge 18b.

The cut in the sliding fastener in this case is rectilinear and not V-shaped. The hooking elements are, as in the embodiment shown in FIG. 7, separated for a short distance *b* but, in addition, the heat given out and retained in the recesses form two small weld beads 30 (FIG. 8) which form upper stop points and also facilitate the introduction of the slide.

It must be understood that the various modifications are not exclusive and the various sonotrodes can include cutting edges and bosses of different shape.

It will be observed that the device according to the invention is small, the inclination of the sonotrode permitting it to be disposed rather near the foot of the/-presser foot of the machine without hindering the operator. Further, the device carries out simultaneously a cut and a connection on a sliding fastener so that time lost when placing the fasteners in position is avoided.

Further, it will be observed that the metal element constituting the sonotrode can be replaced by an element which is provided with cutting means and means forming by welding and is, for example, heated electrically and undergoes a reciprocating movement.

Having now described my invention what I claim and desire to secure by Letters Patent is:

1. A device for cutting a length of a sliding fastener strip which is composed of plastics material and supplied continuously and sewn to a series of workpieces, and for simultaneously forming a stop connection on the next length of said sliding fastener strip, comprising in combination : an element having means for cutting the whole width of the fastener and means for forming by welding action a stop connection, said two means being offset from each other in the direction in which the fastener is supplied, means imparting to the element an alternating movement, means defining a base having an inverted V-shaped longitudinal section, guiding means for the sliding fastener on said base and an anvil lying in a plane secured on an inclined face of said base, said element being correspondingly inclined and said means imparting to said element an alternating movement in a direction perpendicular to said anvil plane.

2. A device as claimed in claim 1, wherein the cutting means have a beveled cutting edge and the forming means comprise a rectangular-sided block located at a distance from the cutting edge with respect to said direction in which the fastener is guided.

3. A device as claimed in claim 2, wherein the cutting edge has a V shape transversely of said direction in which the fastener is guided so as to produce a V-shaped cut in the fastener and facilitate a subsequent assembly of a slide with the fastener.

4. A device as claimed in claim 2, wherein the block has a recessed centre part so that the block has a U shape, the U shape having limbs acting as guide means for the sliding fastener.

5. A device as claimed in claim 2, wherein the beveled cutting edge has the general shape of a T.

6. A device as claimed in claim 1, wherein the guide means comprise two L-sectioned members fixed to the base at a distance from and parallel to each other so as to define a guide recess.

7. A device as claimed in calim 1, wherein the cutting means and the forming means are engraved in the element which is metallic and connected to a generator of ultrasounds.

* * * * *